United States Patent
Yang et al.

(10) Patent No.: US 12,391,403 B1
(45) Date of Patent: Aug. 19, 2025

(54) AIRCRAFT TAKE-OFF AND LANDING DEVICE

(71) Applicants: Chunshan Yang, Liaoning (CN); Xuanjia Wang, Liaoning (CN)

(72) Inventors: Chunshan Yang, Liaoning (CN); Xuanjia Wang, Liaoning (CN)

( * ) Notice: Subject to any disclaimer, the term of this patent is extended or adjusted under 35 U.S.C. 154(b) by 0 days.

(21) Appl. No.: 18/776,800

(22) Filed: Jul. 18, 2024

(30) Foreign Application Priority Data

Jun. 13, 2024 (CN) .......................... 202410757448.1

(51) Int. Cl.
*B64F 1/04* (2024.01)
*B64F 1/02* (2006.01)

(52) U.S. Cl.
CPC . *B64F 1/04* (2013.01); *B64F 1/02* (2013.01)

(58) Field of Classification Search
CPC ..................................... B64F 1/04; B64F 1/02
See application file for complete search history.

(56) References Cited

U.S. PATENT DOCUMENTS

| 1,478,747 A | * | 12/1923 | Kinyoun | B64F 1/04 244/110 E |
| 4,653,706 A | * | 3/1987 | Ragiab | B64F 1/02 405/1 |

* cited by examiner

*Primary Examiner* — Valentina Xavier

(57) ABSTRACT

An aircraft take-off and landing comprises two first rollers installed on the runway for the front and rear wheels of an aircraft; a take-off groove is arranged between the two first rollers, first bearings are installed on both sides of the first roller, a gear is installed on the outer ring of the first bearing, the lower part of the gear on one side is meshedly connected with a first large gear, the first large gear is driven by a first motor; the rear sides of the two first rollers are provided with a plurality of second rollers meshing with each other, and a lower roller meshing with the second rollers, a full-length roller and a rubber belt, the lower part of the lower roller is meshedly connected with a second large gear, the second large gear is driven by a second motor.

3 Claims, 2 Drawing Sheets

AIRCRAFT TAKE-OFF AND LANDING DEVICE

TECHNICAL FIELD

The invention relates to the technical field of aircraft take-off and landing equipment, in particular to an aircraft take-off and landing device.

BACKGROUND ART

During the take-off and landing of an aircraft, its stability and safety are the key factors to ensure its normal operation. Currently, in places like aircraft carriers in airports, aircraft require long runways for take-off and landing, as well as catapults and arresters, which occupy a large space and consume a lot of electricity and fuel, resulting in increased usage and maintenance costs. Although these measures meet the basic requirements for aircraft take-off and landing to a certain extent, there is still room for improvement in terms of acceleration during take-off, deceleration during landing, and adapting to changes in runway conditions.

SUMMARY OF THE INVENTION

In order to solve the above existing problems, the invention provides an aircraft take-off and landing device. The invention is achieved through the following technical scheme.

The aircraft take-off and landing device comprises two first rollers installed on the runway for the front and rear wheels of an aircraft;
- a take-off groove is arranged between the two first rollers, first bearings are installed on both sides of the first roller, a gear is installed on the outer ring of the first bearing, the lower part of the gear on one side is meshedly connected with a first large gear, the first large gear is driven by a first motor, the motor shaft of the first motor is provided with a brake connected by electric wires;
- a plurality of second rollers meshing with each other are arranged at the rear side of the two first rollers, the lower part of the middle roller is meshedly connected with a lower roller, the second rollers and the lower roller are installed with second bearings and gears that are located on the outer rings of the second bearings, the lower parts of the second rollers on one side are meshed with a full-length roller, the full-length roller is meshed with the lower roller via a full-length shaft, a rubber belt is arranged between the second rollers, the lower roller and the full-length roller, the lower part of the lower roller is meshedly connected with a second large gear, the second large gear is driven by a second motor;
- the aircraft take-off and landing device is also provided with an aircraft movable wheel assembly, the aircraft movable wheel assembly is composed of aircraft wheels, a partition and an airbag anti-skid pad, the aircraft wheels are located at the bottom of the partition, elastic roll road shafts and elastic shafts that are located on the elastic roll road shafts are arranged on both sides of the partition respectively, the elastic shafts on both sides are connected to the aircraft wheels through an elastic bow, the airbag anti-skid pad is arranged on the upper end surface of the partition.

Further, the depth of the take-off groove matches the aircraft wheels.

Further, the second rollers are thinner than the first rollers, anti-skid patterns are arranged on the second rollers to provide sliding and pressure cushioning The invention has the following advantageous effects:
1. the aircraft take-off and landing device is reasonably designed, simple, and practical, suitable for use on airports, aircraft carriers, etc., aircraft take-off and landing require a very long runway, but with this landing and take-off device, the aircraft can take off from much shorter runways; it can be configured according to the length and width of different aircraft models, allowing various types of aircraft to utilize it;
2. on an aircraft carrier, there's no need for a catapult device, thereby saving a significant amount of electrical energy, the saved energy can then be redirected to power-intensive weapons, this approach reduces costs, shortens runway distances, and increases the available space on the aircraft carrier deck; for aircraft carrier's interior, the catapult device takes up considerable space. To address this, landing devices are installed at the front and rear of the landing runway, without the need for arresting wires; the landing device is installed on the first section of the landing runway, and the landing and take-off device is installed on the second section of the landing runway, this design prevents aircraft from overshooting the first set of landing device, and if that happens, the landing and take-off device behind can serve as a landing device; additionally, when not in use for landing, these can also be utilized for launching aircraft, serving a dual purpose;
3. when used in passenger aircrafts at airports, it can significantly reduce fuel consumption, shorten the runway distance, and improve the take-off performance of aircrafts; large aircrafts can take off and land at small airports, with the installation of landing devices on the landing runway, the landing of aircrafts will become more reliable and safe;
4. it can prevent aircraft accidents, such as brake failure, the landing device is equipped with a temporary aircraft wheel assembly to prevent the aircraft wheels from failing to land, if the aircraft slides onto the landing device, it can safely stop.

BRIEF DESCRIPTION OF ACCOMPANY DRAWINGS

SPECIFIC EMBODIMENT OF THE INVENTION

In order to make the objects, technical schemes and advantages of the embodiments of the invention clearer, the technical scheme in the embodiments of the invention will be clearly and completely described below in combination with the accompanying drawings in the embodiments of the invention.

Embodiment

Figure 1:
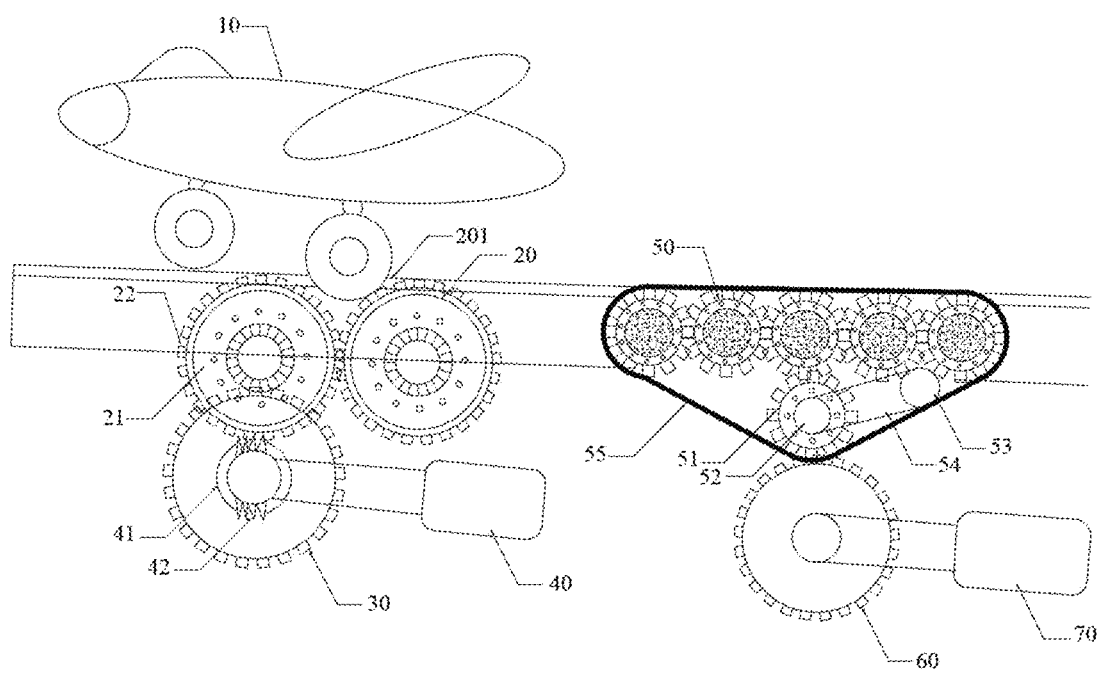
FIG. 1 is a schematic diagram of the aircraft take-off and landing device of the invention.
Figure 2:
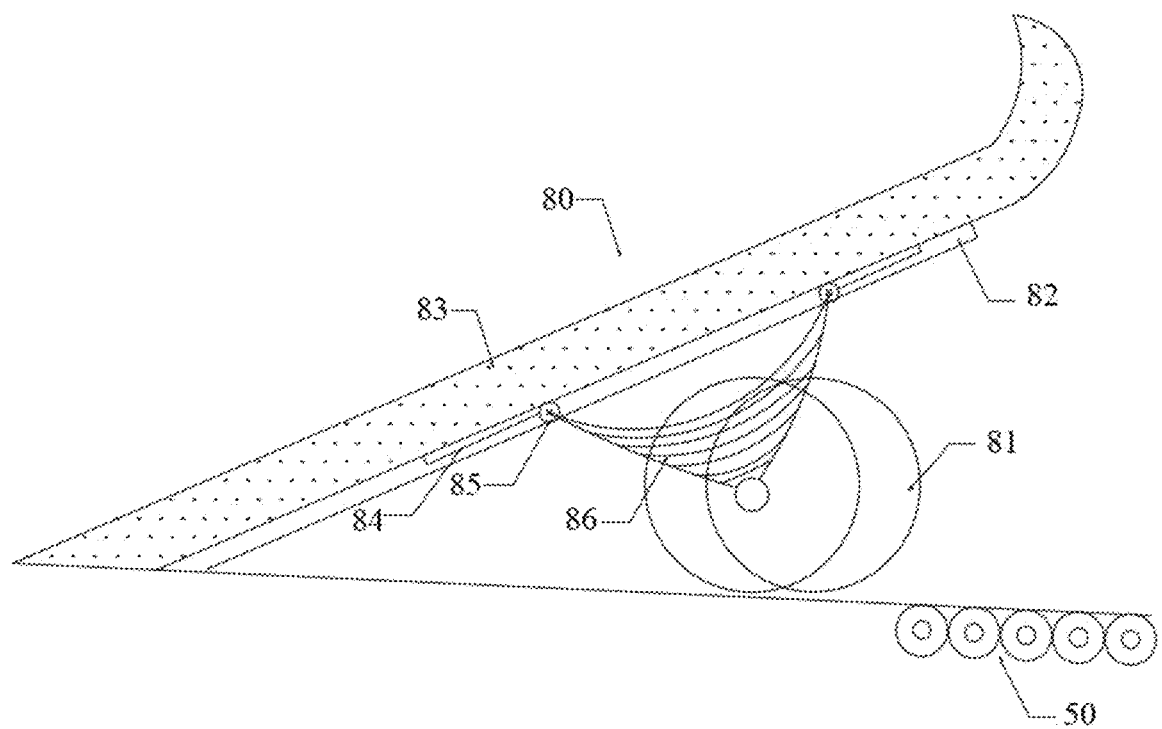
FIG. 2 is a schematic diagram of the structure of the aircraft movable wheel assembly.

An aircraft take-off and landing device, comprising two first rollers 20 installed on the runway for the front and rear wheels of an aircraft 10;
a take-off groove 201 is arranged between the two first rollers 20, first bearings 21 are installed on both sides of the first roller 20, a gear 22 is installed on the outer ring of the first bearing 21, the lower part of the gear 22 on one side is meshedly connected with a first large gear 30, the first large gear 30 is driven by a first motor 40, the motor shaft of the first motor 40 is provided with a brake 41 connected by electric wires, as shown in FIG. 1, and also comprises springs 42;

a plurality of second rollers 50 meshing with each other are arranged at the rear side of the two first rollers 20, the lower part of the middle roller 50 is meshedly connected with a lower roller 51, the second rollers 50 and the lower roller 51 are installed with second bearings 52 and gears that are located on the outer rings of the second bearings, the lower parts of the second rollers 50 on one side are meshed with a full-length roller 53, the full-length roller 53 is meshed with the lower roller 51 via a full-length shaft 54, a rubber belt 55 is arranged between the second rollers 50, the lower roller 51 and the full-length roller 53, the lower side of the rubber belt 55 is provided with bud-shaped protrusions for the rollers on the upper and lower belt. In addition to a groove arranged at the same position, the bud-shaped protrusions are fixed in the roller groove to fix the belt and prevent the tape from sliding, the lower part of the lower roller 51 is meshedly connected with a second large gear 60, the second large gear 60 is driven by a second motor 70;

the aircraft take-off and landing device is also provided with an aircraft movable wheel assembly 80, the aircraft movable wheel assembly 80 is composed of aircraft wheels 81, a partition 82 and an airbag anti-skid pad 83, the aircraft wheels 81 are located at the bottom of the partition 82, elastic roll road shafts 84 and elastic shafts 85 that are located on the elastic roll road shafts 84 are arranged on both sides of the partition 82 respectively, the elastic shafts 85 on both sides are connected to the aircraft wheels 81 through an elastic bow 86, the airbag anti-skid pad 83 is arranged on the upper end surface of the partition 82.

Further, the depth of the take-off groove 201 matches the aircraft wheels.

Further, the second rollers 50 are thinner than the first rollers 20, anti-skid patterns are arranged on the second rollers 50 to provide sliding and pressure cushioning.

The aircraft take-off and landing device is reasonably designed, simple, and practical, suitable for use on airports, aircraft carriers, etc., aircraft take-off and landing require a very long runway, but with this landing and take-off device, the aircraft can take off from much shorter runways; it can be configured according to the length and width of different aircraft models, allowing various types of aircraft to utilize it, for instance, on an aircraft carrier, there's no need for a catapult device, thereby saving a significant amount of electrical energy, the saved energy can then be redirected to power-intensive weapons such as laser weapons or electromagnetic railguns, this approach reduces costs, shortens runway distances, and increases the available space on the aircraft carrier deck;

For aircraft carrier's interior, the catapult device takes up considerable space. To address this, landing devices are installed at the front and rear of the landing runway, without the need for arresting wires; the landing device is installed on the first section of the landing runway, and the landing and take-off device is installed on the second section of the landing runway, this design prevents aircraft from overshooting the first set of landing device, and if that happens, the landing and take-off device behind can serve as a landing device; additionally, when not in use for landing, these can also be utilized for launching aircraft, serving a dual purpose;

The aircraft's rear-wheel landing and take-off device can be used as a single unit or separately; for the landing device, common wheels are required, and they are installed according to the widest aircraft; according to the length of the aircraft, the front wheel is installed with the landing device, then it is possible to make large, medium, and small aircraft to land; the aircraft's movable wheels are placed in front of the landing device made up of the second rollers, if they are placed on the landing and take-off device, they may be thrown off;

the aircraft's rear-wheel landing device requires common rollers, so that it can be used for large, medium, and small aircraft; according to the length of the aircraft, the front wheel is installed with the landing device, then it is possible to make different aircraft to land;

the front wheels of the landing and take-off device use the landing device rollers that interlock with each other and are based on the length of small or large aircraft, a rubber runway is placed on top, and a single motor can facilitate the takeoff and landing of aircraft of different sizes.

In airport operations, a single runway can be equipped with multiple landing and take-off devices, which enhance aircraft takeoff speed.

When it comes to specific implementation, two first rollers are installed on the runway for the front and rear wheels of an aircraft, the depth of the take-off groove matches the aircraft wheels, first bearings are installed on both sides of the first roller, a gear is installed on the outer ring of the first bearing, the lower part of the gear is installed with a first large gear to increase the rotation speed, the speed should match the take-off speed of the aircraft, the first large gear is driven by a first motor, the motor shaft is provided with a brake, the brake is connected with electric wires for unified dispatch, the speed of the first motor is controlled and gradually accelerates to the take-off speed of the aircraft; when the speed of the aircraft after starting to accelerate exceeds the speed of the rollers, the first motor is stopped and the brake is used, the aircraft will roll out between the two rollers, reach the plane, accelerate rapidly, and take off on a very short runway, because the speed of rotation has reached the take-off speed.

The landing rollers of the aircraft are thinner than the take-off rollers, as the thinning design can prevent significant aircraft vibrations; multiple rollers are installed to reduce the impact force after landing, the take-off and landing rollers are interlocked, one motor can drive the rotation of other rollers; the rollers are equipped with anti-slip patterns to prevent sliding and serve the purpose of pressure buffering; once the aircraft lands on the rollers, it will come to a stop as the rollers rotate, but the aircraft's wheels still rotate on the rollers, so the aircraft needs to apply the brake, and then stop the motor, and the aircraft will naturally come to a complete stop.

For use in small unmanned aerial vehicle (UAV), the design is even simpler; it does not need a motor to drive the rollers, just install two landing and take-off devices at the rear; the UAV can rotate on the rollers to achieve the necessary take-off speed; by applying the brake to the rollers, the UAV can then roll out of the rollers and accelerate for take-off.

The invention and its embodiments are described above, this description is not restrictive, and what is shown in the accompanying drawing is only one of the embodiments of the invention, and the actual structure is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. An aircraft take-off and landing device, comprising two first rollers installed on the runway for the front and rear wheels of an aircraft;

a take-off groove is arranged between the two first rollers, first bearings are installed on both sides of the first roller, a gear is installed on the outer ring of the first bearing, the lower part of the gear on one side is meshedly connected with a first large gear, the first large gear is driven by a first motor, the motor shaft of the first motor is provided with a brake connected by electric wires;

a plurality of second rollers meshing with each other are arranged at the rear side of the two first rollers, the lower part of the middle roller is meshedly connected with a lower roller, the second rollers and the lower roller are installed with second bearings and gears that are located on the outer rings of the second bearings, the lower parts of the second rollers on one side are meshed with a full-length roller, the full-length roller is meshed with the lower roller via a full-length shaft, a rubber belt is arranged between the second rollers, the lower roller and the full-length roller, the lower part of the lower roller is meshedly connected with a second large gear, the second large gear is driven by a second motor;

the aircraft take-off and landing device is also provided with an aircraft movable wheel assembly, the aircraft movable wheel assembly is composed of aircraft wheels, a partition and an airbag anti-skid pad, the aircraft wheels are located at the bottom of the partition, elastic roll road shafts and elastic shafts that are located on the elastic roll road shafts are arranged on both sides of the partition respectively, the elastic shafts on both sides are connected to the aircraft wheels through an elastic bow, the airbag anti-skid pad is arranged on the upper end surface of the partition.

2. The aircraft take-off and landing device of claim 1, wherein the depth of the take-off groove matches the aircraft wheels.

3. The aircraft take-off and landing device of claim 1, wherein the second rollers are thinner than the first rollers, anti-skid patterns are arranged on the second rollers to provide sliding and pressure cushioning.

* * * * *